US006470347B1

(12) United States Patent
Gillam

(10) Patent No.: US 6,470,347 B1
(45) Date of Patent: Oct. 22, 2002

(54) METHOD, SYSTEM, PROGRAM, AND DATA STRUCTURE FOR A DENSE ARRAY STORING CHARACTER STRINGS

(75) Inventor: Richard Theodore Gillam, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,417

(22) Filed: Sep. 1, 1999

(51) Int. Cl.⁷ .............................................. G06F 17/00
(52) U.S. Cl. ...................... 707/101; 707/10; 707/104.1; 704/10
(58) Field of Search ................................ 707/100, 101, 707/104.1; 704/10

(56) References Cited

U.S. PATENT DOCUMENTS

| | | | |
|---|---|---|---|
| 4,955,066 A | 9/1990 | Notenboom ................ 382/240 |
| 5,016,009 A | 5/1991 | Whiting et al. ............... 341/67 |
| 5,058,144 A | 10/1991 | Fiala et al. .................. 375/240 |
| 5,109,433 A | 4/1992 | Notenboom ................ 382/240 |
| 5,126,739 A | 6/1992 | Whiting et al. ............... 341/67 |
| 5,146,221 A | 9/1992 | Whiting et al. ............... 341/67 |
| 5,150,119 A | 9/1992 | Yoshida et al. ............... 341/51 |
| 5,151,697 A | 9/1992 | Bunton ........................ 341/51 |
| 5,153,591 A | 10/1992 | Clark .......................... 341/51 |
| 5,412,384 A | 5/1995 | Chang et al. ................. 341/79 |
| 5,463,389 A | 10/1995 | Klayman ..................... 341/51 |
| 5,463,390 A | 10/1995 | Whiting et al. ............... 341/51 |
| 5,506,580 A | 4/1996 | Whiting et al. ............... 341/51 |
| 5,534,861 A | 7/1996 | Chang et al. ................. 341/79 |
| 5,592,667 A | 1/1997 | Bugajski ..................... 707/102 |
| 5,614,899 A | 3/1997 | Tokuda et al. ................ 341/51 |
| 5,701,468 A | 12/1997 | Benayoun et al. .......... 707/101 |
| 5,748,955 A | 5/1998 | Smith ......................... 707/101 |
| 5,841,376 A | 11/1998 | Hayashi ...................... 341/51 |
| 5,883,588 A | 3/1999 | Okamura ...................... 341/5 |
| 6,298,321 B1 * | 10/2001 | Karlov et al. ................. 704/10 |

FOREIGN PATENT DOCUMENTS

| | | |
|---|---|---|
| EP | 0340039 | 4/1989 |
| EP | 0584992 | 8/1993 |
| EP | 0855803 | 7/1998 |
| WO | 9833279 | 7/1998 |

OTHER PUBLICATIONS

U.S. application Ser. No. 09/388,329, filed Sep. 1, 1999, entitled "Method, System, and Program for Generating a Deterministic Table to Determine Boundaries Between Characters".

U.S. application Ser. No. 09/388,007, filed Sep. 1, 1999, entitled "Method, System, and Program for Determining Boundaries in a String Using a Dictionary".

(List continued on next page.)

Primary Examiner—Kim Vu
Assistant Examiner—Hung Q Pham
(74) Attorney, Agent, or Firm—David W. Victor; Konrad Raynes Victor & Mann LLP

(57) ABSTRACT

Disclosed is a system, method, and program for generating a data structure in computer memory for storing strings, such as words in a dictionary. Each string includes at least one character from a set of characters. An arrangement of nodes is determined to store the characters such that the arrangement of the nodes is capable of defining a tree structure. An array data structure is generated to store the nodes. The array includes a row for each node and a column for each character in the set of characters. A non-empty cell identifies a node for the character indicated in the column of the cell that has descendant nodes in the row indicated in the cell content for the node. The array data structure is processed to eliminate at least one row in the array data structure to reduce a number of bytes needed to represent the array data structure. In this way, the array data structure following the processing requires less bytes of storage space then before the processing.

39 Claims, 8 Drawing Sheets

OTHER PUBLICATIONS

U.S. application Ser. No. 09/388,330, filed Sep. 1, 1999, entitled "Method, System and Program for Generating a Table to Determine Boundaries Between Characters".

Micheal Main and Walter Savitch, Data Structure and other Objects Using C++, Copyright 1997 by Addison Wesley Longman, pp. 492–530.*

* cited by examiner

METHOD, SYSTEM, PROGRAM, AND DATA STRUCTURE FOR A DENSE ARRAY STORING CHARACTER STRINGS

BACKGROUND OF THE INVENTION

1. Field of the Invention

The field of the present invention relates to a method, system, program, and data structure for a dense array storing character strings that provides improved compression over current array structures for storing character strings.

2. Description of the Related Art

Many operations on text require or benefit from some type of dictionary. A "dictionary" generally comprises an abstract list of character strings to represent and the data structure to store that list of character strings. A "word" is one of the individual character strings stored in the dictionary. An "alphabet" refers to the repertoire of characters needed to represent all of the words in the dictionary. For instance, a dictionary of English words has an alphabet consisting of the letters of the Latin alphabet, plus some punctuation marks, such as the hyphen and apostrophe, that can appear in the middle of a word. In French, the alphabet would also include certain accented letters used in French; in Arabic, the alphabet would consist of the Arabic alphabet, plus various Arabic punctuation marks, but not the letters from the Latin alphabet.

Dictionaries are used for spell-checking, hyphenation, and other types of morphological analysis. However, storing a long list of words (the English language, for example, has some 30,000 words in common use, out of a total vocabulary of well over 100,000 words) can consume a substantial amount of storage space and be quite cumbersome to search for a particular word.

Two general schemes to store lists of objects in computer memory include arrays and linked data structures. An array is a list where all of the items are the same size and stored contiguously in a single range of memory. Accessing a single item is direct and fast, because the address of the item can be calculated easily from the address of the array and the item's line number. A linked list, on the other hand, is a structure where each item in the list is stored in an independent range of memory along with the address of the next item in the list. The memory block containing the item data and the pointer to the next item is called a "node." Accessing items in the list can require searching numerous nodes. Typically, a search starts at the first node in the list and follows the links until the desired item is reached. This can be especially time consuming if the linked list has a substantial number of nodes, such as the number of nodes needed to represent the words in a dictionary.

One family of linked data structures are called "trees." In a tree, each node in the tree may point to two or more further nodes. The nodes a node points to are called its "children." Every node in the tree is pointed to by only one other node (its "parent"), except for the "root node," through which the entire tree is accessed. A node with no children is called a "leaf." One of the most common abstract representations of a tree data structure is called a "trie." The nodes in a trie represent only a single character in the word of which they are a part. Each node can have an arbitrary number of children (in the dictionary application, the maximum number of children is the number of characters in the alphabet plus one). This approach allows redundancy to be squeezed out of a list of words because all words starting with the same letters share the nodes representing those letters.

FIG. 1 illustrates a trie implementing a tree data structure such that any node can point to any number of additional nodes. The trie in FIG. 1 stores the characters in the phrase "Now is the time for all good men to come the aid of their country." Each child of the root node has the first character in each word of the phrase, each child of the child of the root has the second character in each word beginning with the character at the child node to the root node. Thus, the i children of each jth node includes the (j+1)th character in the i strings having the previous j characters at the nodes on branches contiguously connecting the root node to the jth node. An empty node indicates an end of a string or word. Examples of strings that share the same node include "come" and "country" that share the nodes for "co" and all of the words that start with "t" are children of the "t" node.

FIG. 2 illustrates a trie represented as a binary tree also storing the characters of the phrase "Now is the time for all good men to come to the aid of their country." Each node in the trie is represented by one or more nodes in the binary tree. The root node of the trie, for example, is represented by the chain of nodes going down the right-hand side of the diagram (the nodes here have been rearranged into alphabetical order, a technique that can speed up the search). The "a" node in FIG. 1 is represented by the "i" and "l" nodes in the upper left-hand corner of FIG. 2. To search the trie represented as a binary tree as shown in FIG. 2, the algorithm would follow the below steps:

1. Begin at the root node ("a" in FIG. 2). Compare the first letter of the word to the letter in the root node. If there is a match, proceed to step 3.
2. If there isn't a match, follow the node's right link and match the letter against that node's letter. If there isn't a match, repeat this step. Proceed until either a match is found or the current node has no right link. If there is no right link, the algorithm terminates and the word isn't in the dictionary. Otherwise, continue to step 3.
3. If the matching node's letter is the "not in the alphabet" token, the algorithm terminates and the word is present in the dictionary.
4. Otherwise, follow the node's left link and advance to the next letter in the word. (If there are no more letters in the word, use the "not in the alphabet" token as the next letter.) Compare this new letter to the current node's letter and go back to step 2.

Another type of data structure that may be used to store strings of characters, such as the words in a dictionary, is an array or matrix. In fact, the tree data structures discussed above may be converted to an array data structure. FIG. 3 illustrates an array in which the phrase "Now is the time for all good men to come to the aid of their country" is stored. Each row is a node in the trie (the root node is row 0). Each column contains the link fields of all nodes corresponding to the letter at its head (e.g., the "o" column contains all of the link fields corresponding to the letter "o"). A period represents an empty link (e.g., the period in the "b" column of row 0 means that there are no words in the dictionary starting with "b", and the period in the "d" column of row 15 means there are no words in the dictionary beginning with "ad"). In this way, the periods represent the absence of branches in FIG. 1. Internally, the periods are represented by the value 0, since nothing can loop back to the root node. The # sign at the top of the last column is the column for the "not in the alphabet" character. A negative one (−1) in this column is a link to the "end of word" node. In this way, nodes and characters of strings may be ascertained from the array shown in FIG. 3.

Arrays provide faster searching for strings than trees. With trees, the nodes of the trees must be traversed to find a node matching the first character of the subject string. However, with arrays, the first character is instantly located in row zero in the column corresponding to the first character. Subsequent characters or dependent nodes can readily be determined from the array without having to traverse, and access, non-matching nodes. Although arrays are faster to search, they are not as efficient at storing data as trees are, as there may be numerous empty cells in the array. As can be seen, the tries in FIGS. 1 and 2 have no non-empty nodes or cells whereas the array in FIG. 3 has more empty cells than non-empty. In fact, the array in FIG. 3 is referred to as a sparse array because many array cells are empty.

Both the search processing speed and storage factors increase in importance as more words are included in the data structure, such as the case with word dictionaries used for looking up words or spell checking. For instance, with a dictionary, the amount of bytes the data structure consumes is particularly important because the dictionary is most efficiently processed when the entire dictionary is loaded into volatile or temporary memory. There is thus a need in the art for a method, system, and program for providing an improved data structure for storing data and, in particular, storing lists of words.

SUMMARY OF THE PREFERRED EMBODIMENTS

To overcome the limitations in the prior art described above, preferred embodiments disclose a method, system, and program for generating a data structure in computer memory for storing strings. Each string includes at least one character from a set of characters. An arrangement of nodes is determined to store the characters such that the arrangement of the nodes is capable of defining a tree structure. An array data structure is generated to store the nodes. The array includes a row for each node and a column for each character in the set of characters. A non-empty cell identifies a node for the character indicated in the column of the cell that has descendant nodes in the row indicated in the cell content for the node. The array data structure is processed to eliminate at least one row in the array data structure to reduce a number of bytes needed to represent the array data structure. In this way, the array data structure following the processing requires less bytes of storage space than before the processing.

In further embodiments, rows are eliminated by determining whether any two rows in the array data structure have a same value in every column. One of the two rows having the same value in every column is deleted. In this way duplicate rows are deleted. An index may be provided including an entry identifying the row in the array data structure including the content for the duplicate deleted row.

In still further embodiments, rows are eliminated by determining whether any two rows in the array data structure are capable of being merged. If so, the contents from each column in one of the rows is copied into the same column of another row of the two rows capable of being merged. The copy of the row in the array having its contents copied to the other row may then be deleted. An index may be provided to identify the row in the array including the content of the deleted row and a table may be provided indicating the columns or cells in the row in the array including the descendant nodes for the deleted row.

Preferred embodiments provide a method, system, and program for deleting rows in an array data structure storing nodes of strings to reduce the storage space the array must consume to represent all the nodes of the strings and the connections between the nodes. Preferred embodiments allow the contents of a row to be merged into another row, and the merged row deleted to further reduce the storage space utilized by the array data structure. In such case, different data structures are used to determine the row and cells including the descendant nodes in the merged row. By providing data structures that do not utilize significant space, such as the index and table, rows can be deleted to conserve space in the array and the data structures would indicate the location of the descendant nodes for the deleted row in the array.

By reducing the storage space arrays consume, preferred embodiments increase the benefits of arrays over tree and trie data structures as the arrays the preferred embodiments provide are significantly more efficient in their use of storage space and allow for comparable or faster searching than tree data structures. Further, as the size of the data structures increase, i.e., larger dictionaries, the array of the preferred embodiments allows for significantly faster search times than a tree data structure. The search time of the preferred embodiment array data structure remains constant as the size of the dictionary increases, whereas the search time for a tree data structure increases as the size of the dictionary increases.

BRIEF DESCRIPTION OF THE DRAWINGS

Referring now to the drawings in which like reference numbers represents corresponding parts throughout:

FIG. 3 illustrates an array data structure including cells storing the characters in the words in the phrase "Now is the time for all good men to come to the aid of their country" in a manner known in the art;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 4:
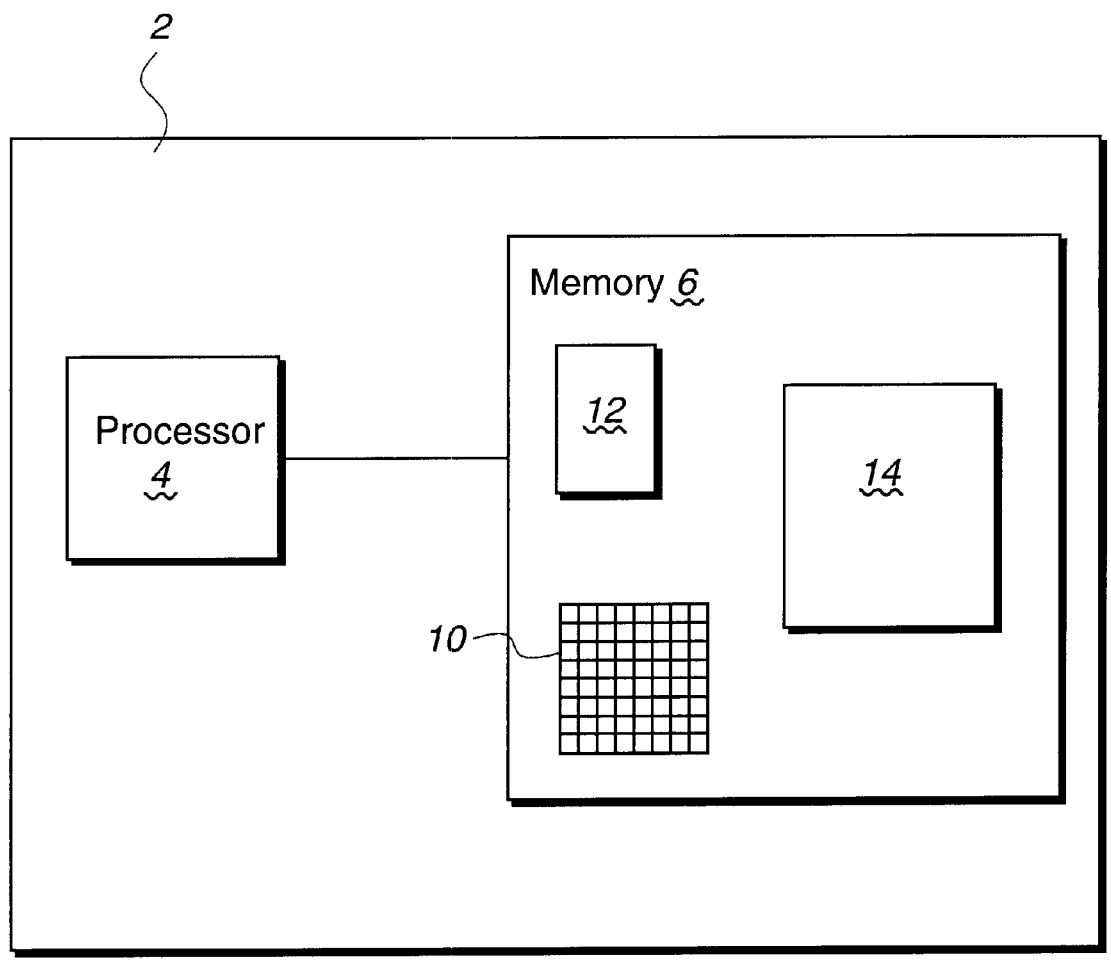
FIG. 4 illustrates a computing environment in which preferred embodiments are implemented.

FIG. 4 illustrates a computing environment in which preferred embodiments are implemented. The computing environment includes a computer system 2 having a processor 4, and a memory 6. The processor 4 may comprise any computer microprocessor device known in the art. The memory 6 may comprise any computer volatile memory device known in the art for storing data structures that the processor 4 is accessing and processing. Alternatively, the memory 6 may comprise any type of non-volatile storage device known in the art capable of being accessed by the processor 4, such as a hard disk drive, tape drive, etc.

The memory 6 includes data structures 10, 12, and 14, which are used to store and access character nodes of strings or words. A dense array 14 includes cells that define the arrangement of the characters in the strings maintained in the array 14. Each non-empty cell contains the row number representing a node that is a descendant of the node represented by the row including the cell. Further included is a bit map data structure 10 and an index 12 to the rows of the array that are used to search the array in the manner discussed below.

Generating and Using the Dense Array

Figure 1:
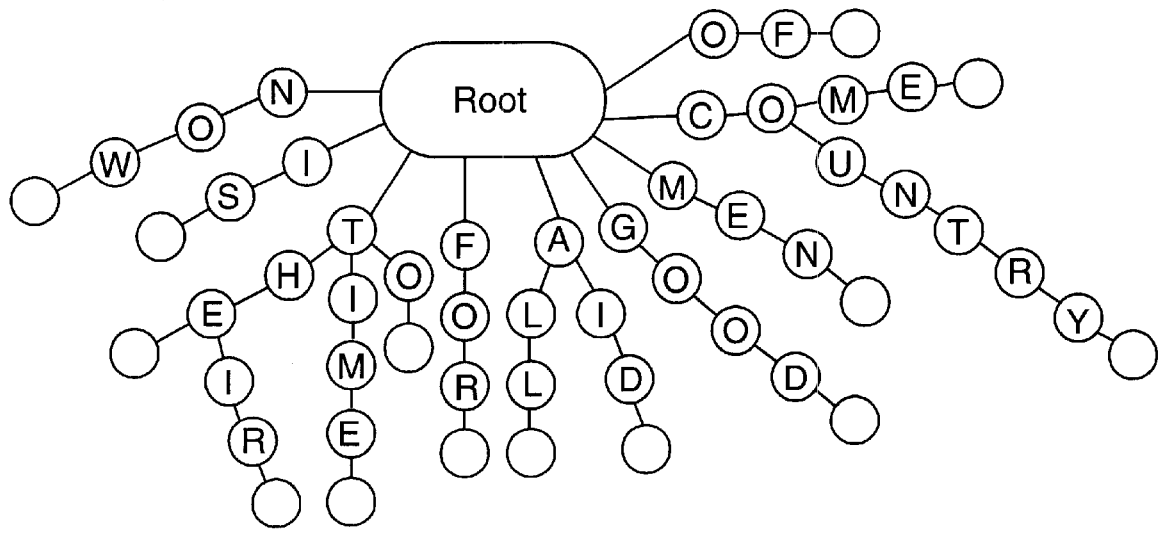
FIG. 1 illustrates a general trie data structure including nodes storing the characters in the words in the phrase "Now is the time for all good men to come to the aid of their country" in a manner known in the art.
Figure 2:
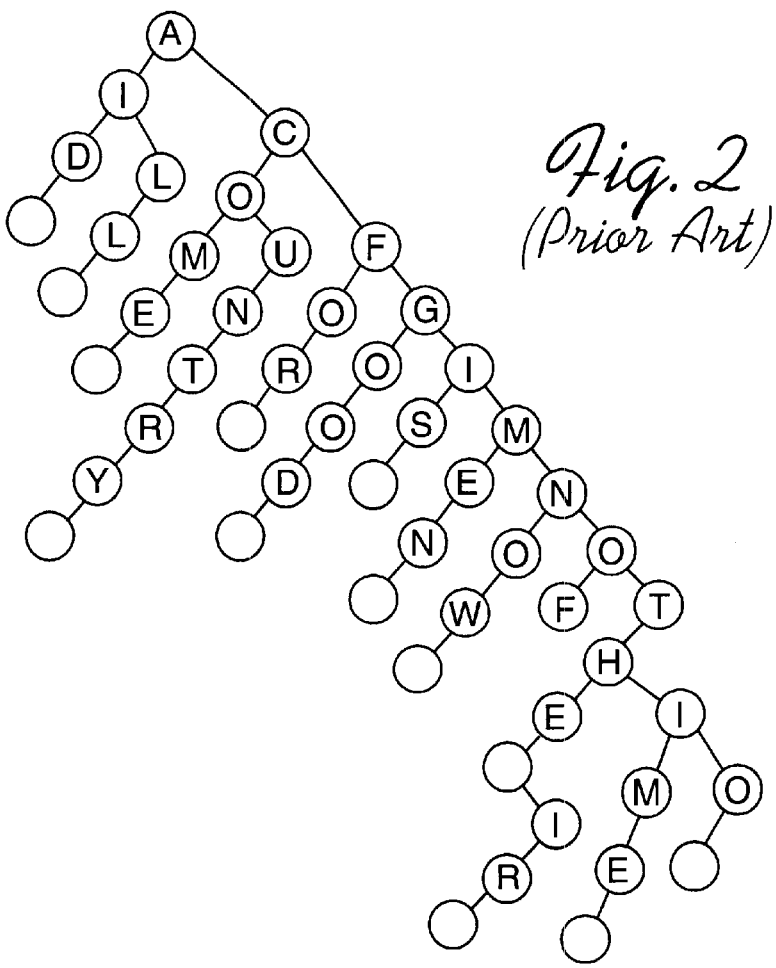
FIG. 2 illustrates a binary tree data structure including nodes storing the characters in the words in the phrase "Now is the time for all good men to come to the aid of their country" in a manner known in the art.
Figures 3, 3A, 3B:
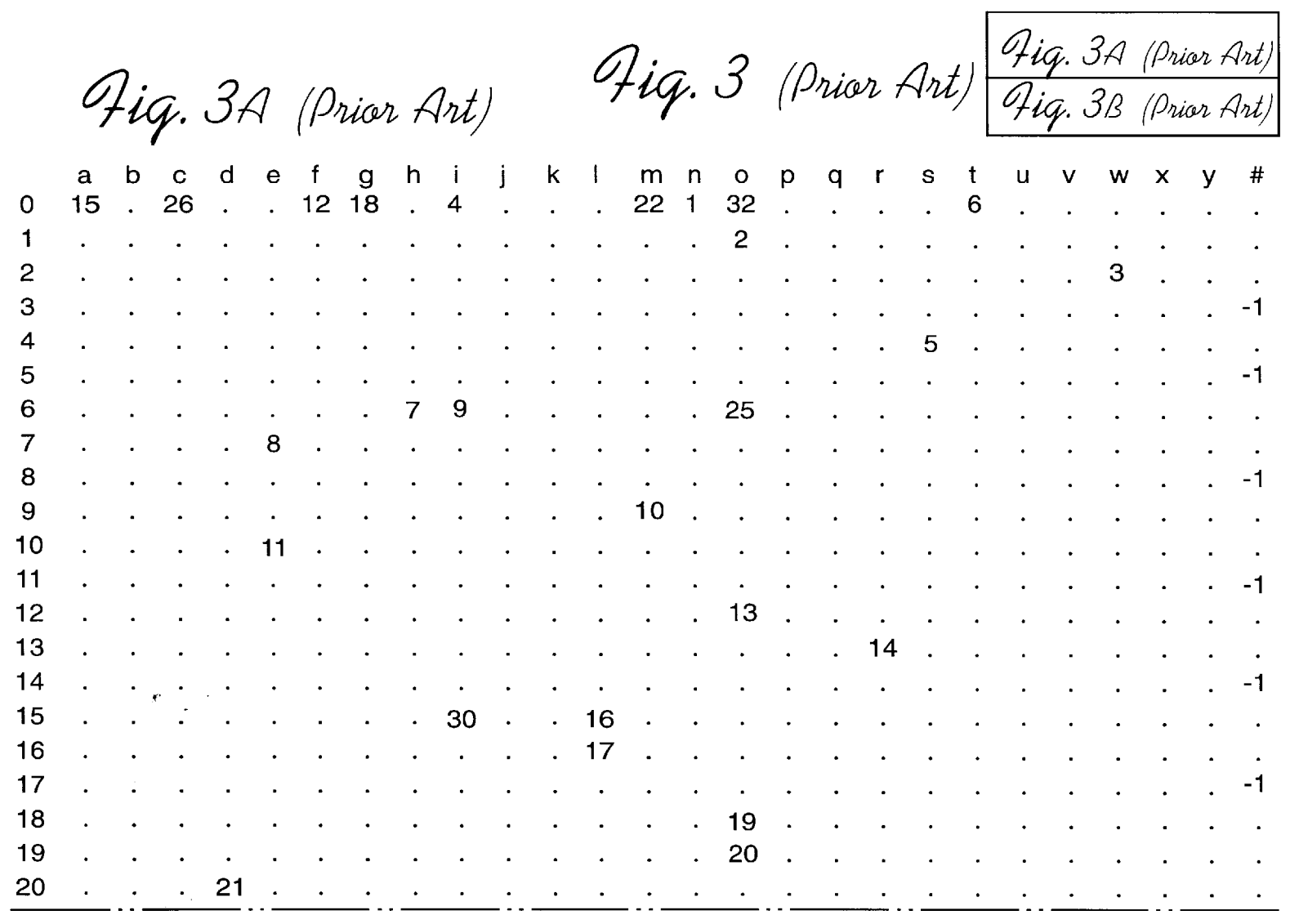
Figure 3B:
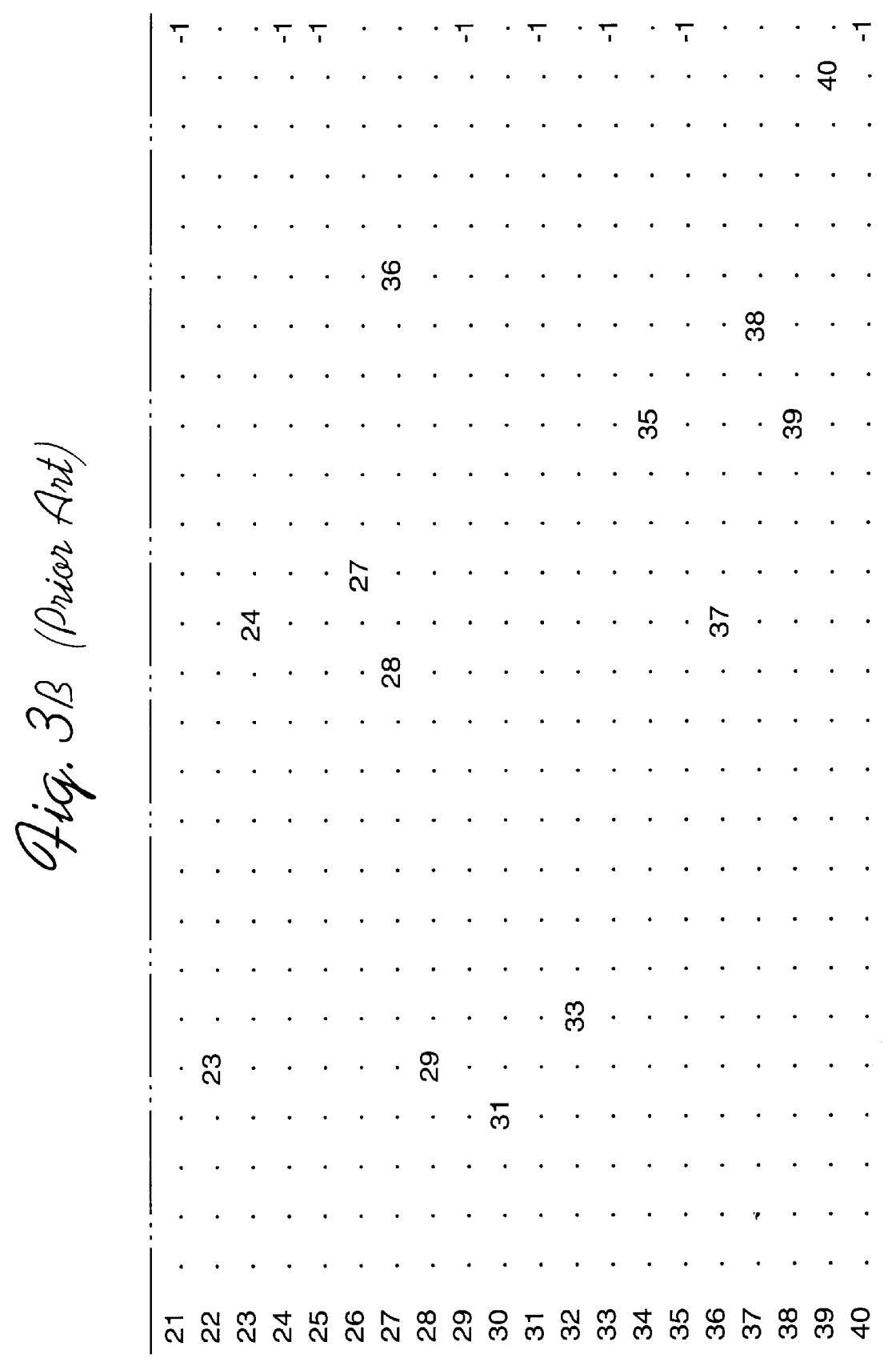
Figure 5A:
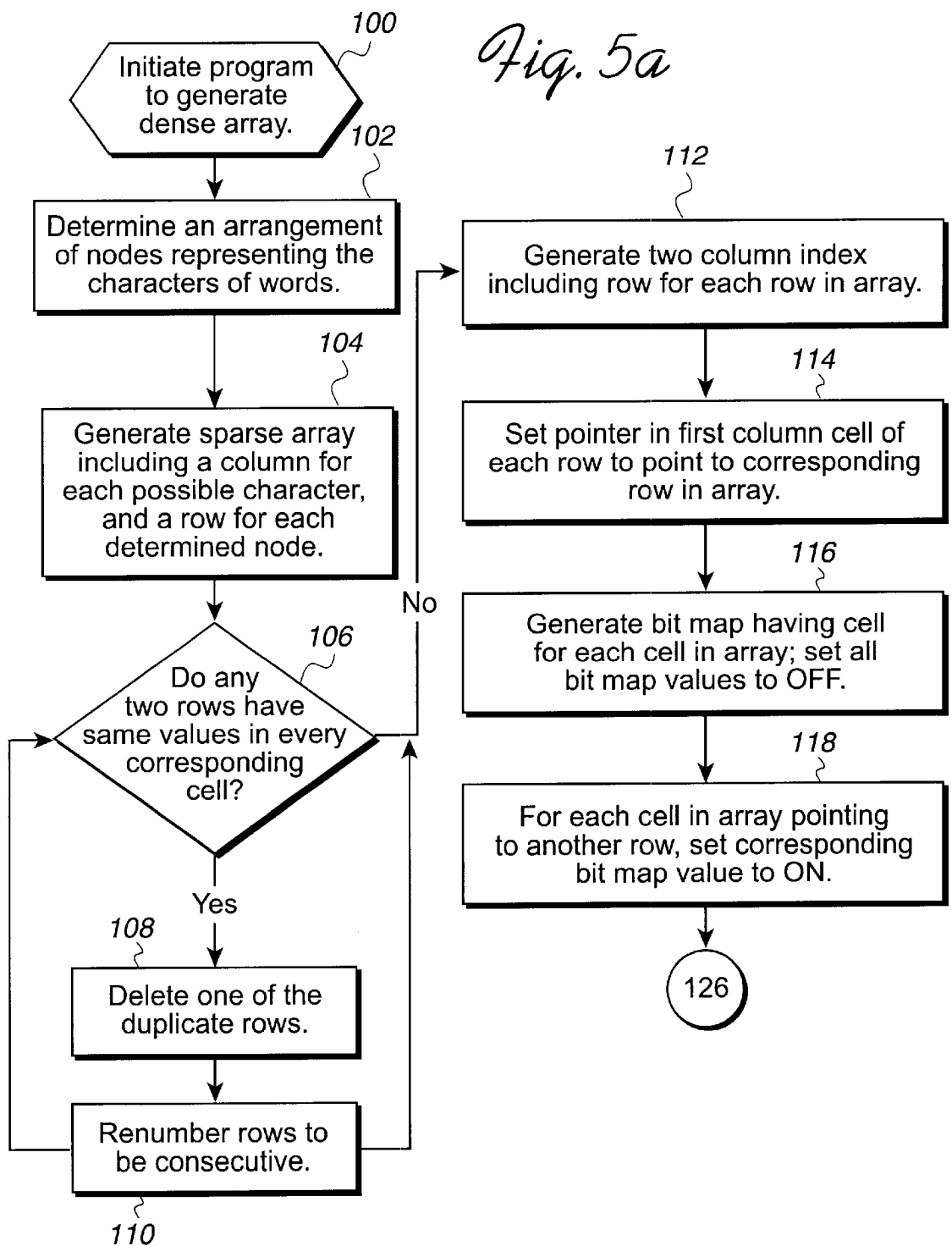
FIGS. 5a, b illustrate logic to generate a dense array in accordance with preferred embodiments of the present invention.
Figure 5B:
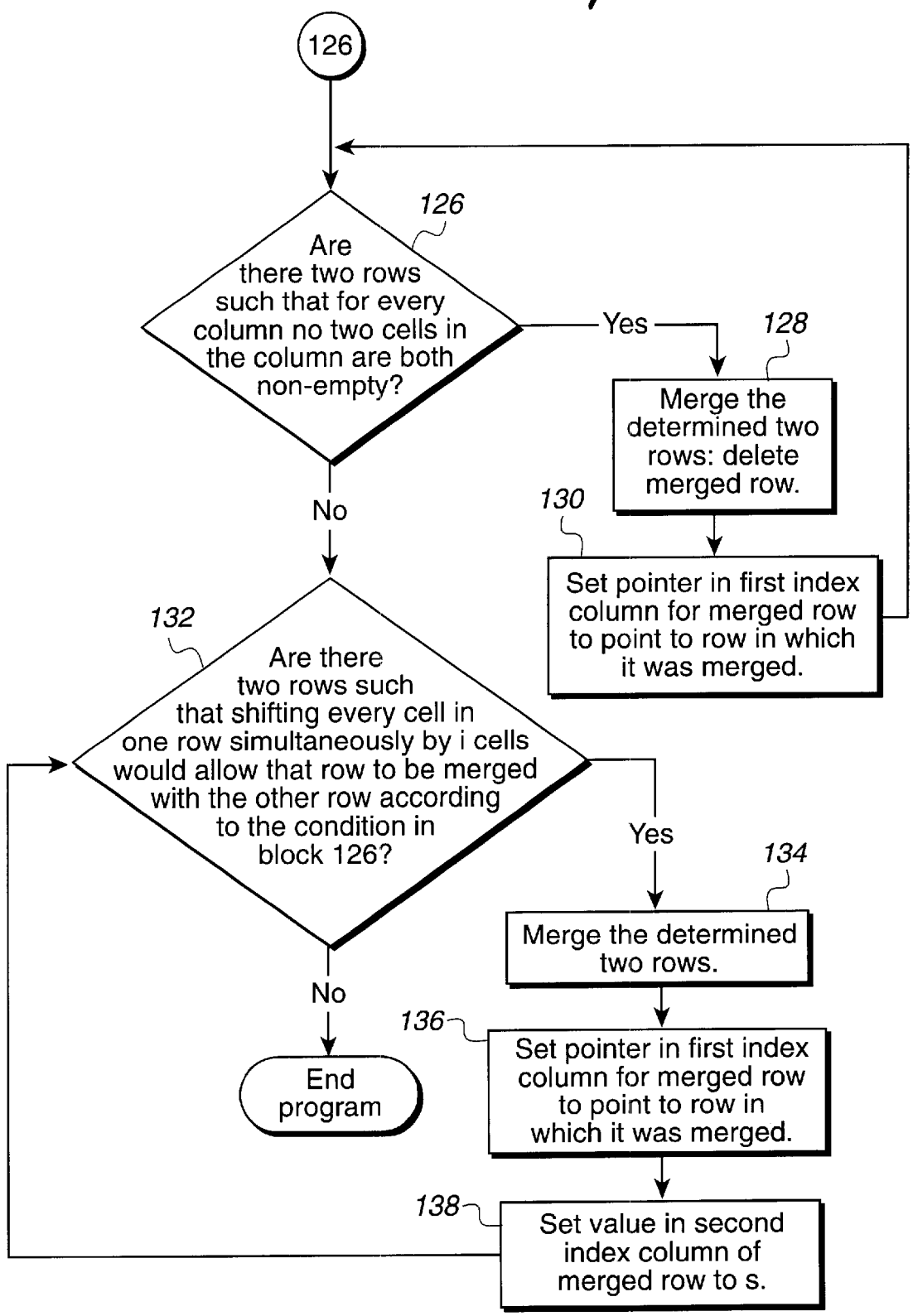

Preferred embodiments include an algorithm for generating a dense array from a sparse array, shown in the flowchart illustrated in FIGS. 5a and 5b. Control begins at block 100 with the initiation of a routine to generate a dense array for storing a set of strings, such as words in a dictionary. The processor 4 determines (at block 102) an arrangement of the characters of all the words into nodes in a manner known in the art. These nodes may be capable of forming a trie data structure known in the prior art, e.g., the tries shown in FIGS. 1 and 2. The processor 4 then generates a sparse array (at block 104) in a manner known in the art, such as shown in FIG. 3. In preferred embodiments, the generated table does not have empty columns, because mapping will insure that one of the used characters in the dictionary is mapped to one column. A column in the array is provided for each possible character in the dictionary's alphabet and an extra column for everything else. In preferred embodiments, a mapping of characters in the alphabet to column numbers is maintained in memory 6. This mapping may comprise a look-up table. In this way, this mapping receives as input a character, and maps the input character to a column in the table. For instance, if case does not matter, then the mapping will map the lower case and capital letter to the same column. Any cell points to a node, rows represent nodes, and the column of the cell indicates the character at the node. The content of the cell indicates a row including one or more descendant of the node. Each descendent node is indicated in the non-empty cells in the row, which indicates the character for the descendant nodes and a row including further descendants of each descendant.

The number of possible characters depends on the alphabet or character set used. Any character set known in the art may be used, such as ASCII, ANSI, extended ASCII, high ASCII, ISO Latin 1, Unicode, etc. Further, with the preferred array data structure, the actual letter is not itself stored in the table; instead, the letter is implicit in which column was used at a row. The −1 column indicates that an end-of-word has been reached. The "#" column indicates that the character is not in the alphabet, which may indicate that an end-of-word has been reached, or it can be a punctuation within a word, such as a hyphen.

The processor 4 then proceeds at block (at block 108) to delete any duplicate rows, i.e., a row that has the exact same cell values as another row, to compress the array. The processor 4 determines (at block 106) whether any two rows have the same value in every corresponding cell, where corresponding cells in two rows are the cells in the same column. If so, the processor 4 deletes (at block 108) one of the duplicate rows, thereby further reducing the number of bytes needed to represent the dense array, and then renumbers (at block 10) the rows to have consecutive numbering. Control then proceeds back to block 106 to determine whether there are any further duplicate rows. From the no branch of block 106 or block 110, the processor 4 generates (at block 112) a two column index 12 that has a row for each row in the array 14 and the first column includes a pointer to one physical row in the array 14. Thus, the rows in the index 12 comprise the logical rows of the array 14 that point to physical rows in the array 14 that include the row for that logical row. The second column includes a shift value for the row in the array corresponding to the index 12 row number. In preferred embodiments, one or more logical rows in the index 12 can map to a single physical row in the array 14. A pointer is set (at block 114) in a second column of each row of the index 12 to point to the corresponding row in the array 14. Thus, the pointer in index row i points to one row in the array. Multiple logical rows could point to one physical row initially if the rows were duplicates. The shift value in the second column indicates whether the cells in the row pointed to by the pointer in the first column need to be shifted to the right or left to determine the values for the row indicated in the first column (the purpose of the shift value is described below). Initially, the second column is populated with all zeros.

The processor 4 also generates (at block 116) a bit map table 10 having a cell for each cell in the array. The bit map values corresponding to empty cells in the array 14 are initially set to OFF, or zero. The cells in the bit map table 10 having non-empty content are set (at block 118) to ON or one. From block 118, control proceeds to block 126 in FIG. 5b. In this way, to determine the row including descendants of the node, the cell content indicating the row including descendant nodes indicates a logical row. The first index 12 column identifies the physical row in the array 14 in which the descendants for the logical row are maintained, and the bit map 10 identifies which cells in the physical row include descendant nodes of the logical row, i.e., are non-empty. Logical row i may point to physical row i in the array, thus indicating that the physical row i has not been deleted or merged into another row during row elimination operations.

In the following operations, the processor 4 performs operations to merge the contents of two non-empty rows to minimize the number of storage cells included in the array 14, thereby optimizing the array's 14 use of memory 6 or storage space. The processor 4 determines (at block 126) whether there are two rows that have the contents of two cells in any column both non-empty. Such rows that satisfy this condition are not capable of being merged (at block 128), i.e., the cells in the same column have different values that cannot be combined as two different values cannot be expressed in the same cell. When the cells in one row are moved or merged (at block 128) into the corresponding columns in another row, then the row from which the contents are copied is deleted as all populated cells for that row are now in the other row. The processor 4 may determine whether no two cells in the same column for two rows are both non-empty by processing the bit map table 10 which indicates which cells are empty and non-empty.

For instance in FIG. 3, row 3 may be merged into row 0 by copying the "3" value from row 2, cell W to row 0, cell W. When merging rows, the index 12 would be modified (130) by setting the pointer of the merged and deleted row to point to the row into which the cell values were merged. The processor 4 could determine the descendants identified in a logical row i, which is the cell content for a node, by looking in index row i to determine the array 14 row identified by the pointer and the bit map table 10 to determine which cells or columns in the identified physical row refer to the descendants in row i. Control then proceeds back to block 126 to continue the determination at block 126 until there are no two rows that can be merged, i.e., all combinations of pairs of rows produce at least one column having both cells non-empty and non-identical. Such rows cannot be merged because the contents of the two rows cannot share the same row as there are conflicting contents in one column.

In preferred embodiments, the references to the merged or deleted rows in the array 14 would remain the same. The processor 4 when determining a row value in a cell would then check the index 12 to determine whether the row value indicated in the contents of the cell was a logical value pointing to another row. Alternatively, when deleting a row during elimination of empty rows, duplicate values or merging, the processor 4 could scan the array 14 for any cells referencing the just deleted row and then change the cell value to the new row including the descendant nodes of the node represented by the just deleted row.

After merging all rows that are capable of being merged, the processor 4 proceeds to determine (at block 132) whether simultaneously shifting all the cell contents to the right or left by s cells, would allow the shifted row to merge with another row according to the condition required at block 126. If so, the processor 4 merges (134) the shifted row with the other row and sets (at block 136) the pointer in the first index 12 column to point to the row into which the shifted row was merged. The processor 4 then sets (at block 138) the second column in the index 12 to the shift value s. The processor 4 may perform the shifting and comparison with rows by shifting all the cells in one row to the right one cell, and then comparing this shifted row with all other rows until the shifted row can be merged or there are no further rows to consider to merge with the shifted row. The processor 4 would then shift again to the right. After shifting all the way to the right, the processor 4 may shift cell contents to the left. If shifting to the left allows a merge, then the second column for the shifted row would have a negative value, indicating a shift to the left. The shift value s allows the processor 4 to determine the descendant nodes in the merged shifted row from the row into which the shifted row was merged. This cell would be determined by applying the shift value to the columns of the cells indicated in the bit map 10 to locate the descendant nodes for the shifted row in the combined row. Thus, if the shift value is 2 and the bit map value for the shifted cell in column j is on, then the descendant node is indicated in the (j+2)th cell. In practice, the merging step and previous merging step can be interleaved.

The memory 6 stores the array 14 during the transitions as it is modified according to the logic of FIGS. 5a, b. Only after the array 14 is completely compressed according to all the steps in FIGS. 5a, b, does the processor 4 then write the compressed array 14 to the file including the array.

Those skilled in the art may appreciate that there are many different ways to implement the above algorithms and determine rows that are eligible for merging or different ways to shift rows to make them capable of being merged. For instance, perhaps only a subset of the steps in FIGS. 5a, b may be performed, e.g., only duplicate rows are removed, only merge operations are performed, etc. Moreover, further methods may be provided to merge the non-empty values from one row into one or more rows, as long as the bit map 10 and index 12 provide information to allow the processor to locate the descendant cells for a particular logical row. With the above preferred data structures, more than one logical row, or nodes of the tree, are stored in a dense array having fewer rows than the number of logical rows, thereby reducing the space needed to form the dense array. When a row in the array 14 is deleted or moved into another row, then the corresponding row in the index 12 becomes a logical row that points to a physical row in the array 14 including the descendant nodes of the logical row. The bit map 10 allows the processor 4 to ascertain which cells in the row specified in the first index 12 column include the non-empty values, i.e., descendants, for the particular logical row.

By eliminating many rows, the resulting dense array has substantially fewer cells than the original sparse array. This substantially reduces the bytes and storage space needed to represent all the words. Further, this dense array performance degrades in the same way as the original sparse array. This dense array search time differs from the sparse array by a constant value to access the index 12 and bit map table 10. The dense array is faster to search than a tree to locate the string. As the size of the data structures increase, the search performance of the dense array improves significantly over the search performance of the tree data structure.

Figure 6:
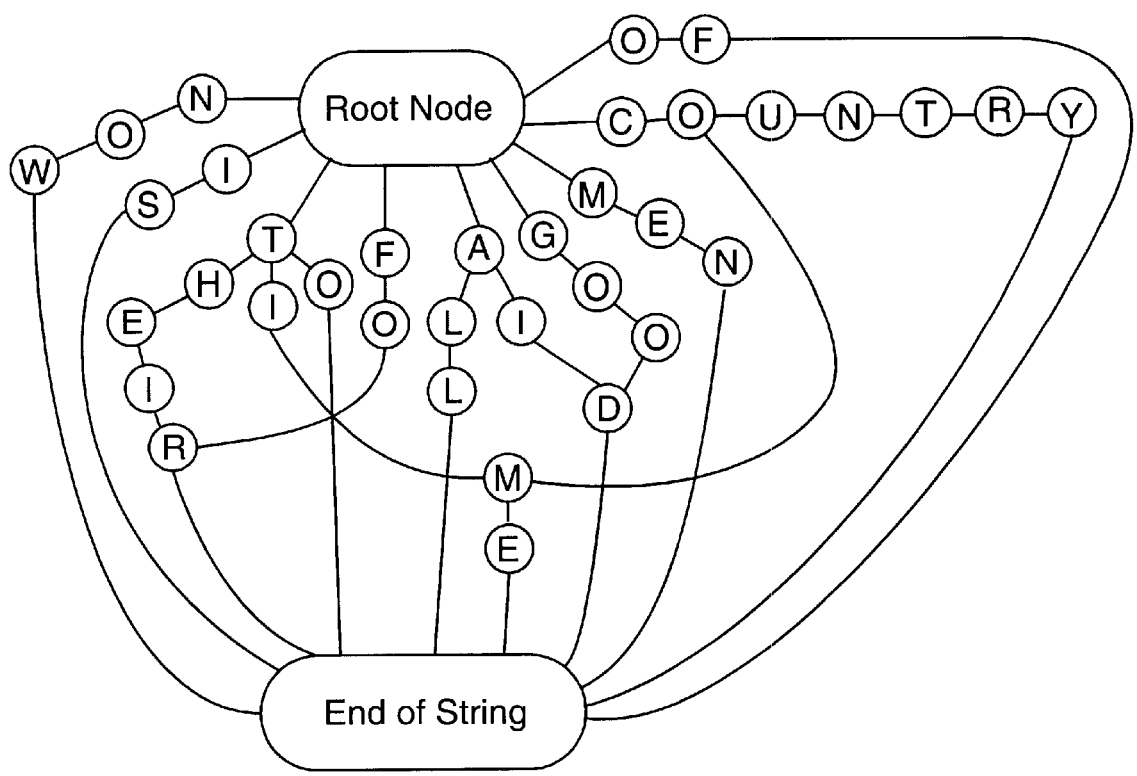
FIG. 6 illustrates a tree data structure representing a dense array in accordance with preferred embodiments of the present invention.

FIG. 6 illustrates a dense array compressed according to the logic in FIGS. 5a, b in general tree form. The topology of FIG. 6 is produced by removing duplicate rows; merging rows does not alter the topology of FIG. 6 further. As can be seen, all strings share the greatest possible substring at the end of the string. For instance, all strings at least share the common end of string character; "time" and "come" both share the same nodes for their last common substring of "me;" "good" and "aid" both share the node for their common substring of the "d" character. This maximizing of node sharing to form the strings reduces the number of nodes or rows in the array 14 needed to express the data structure.

Figure 7:
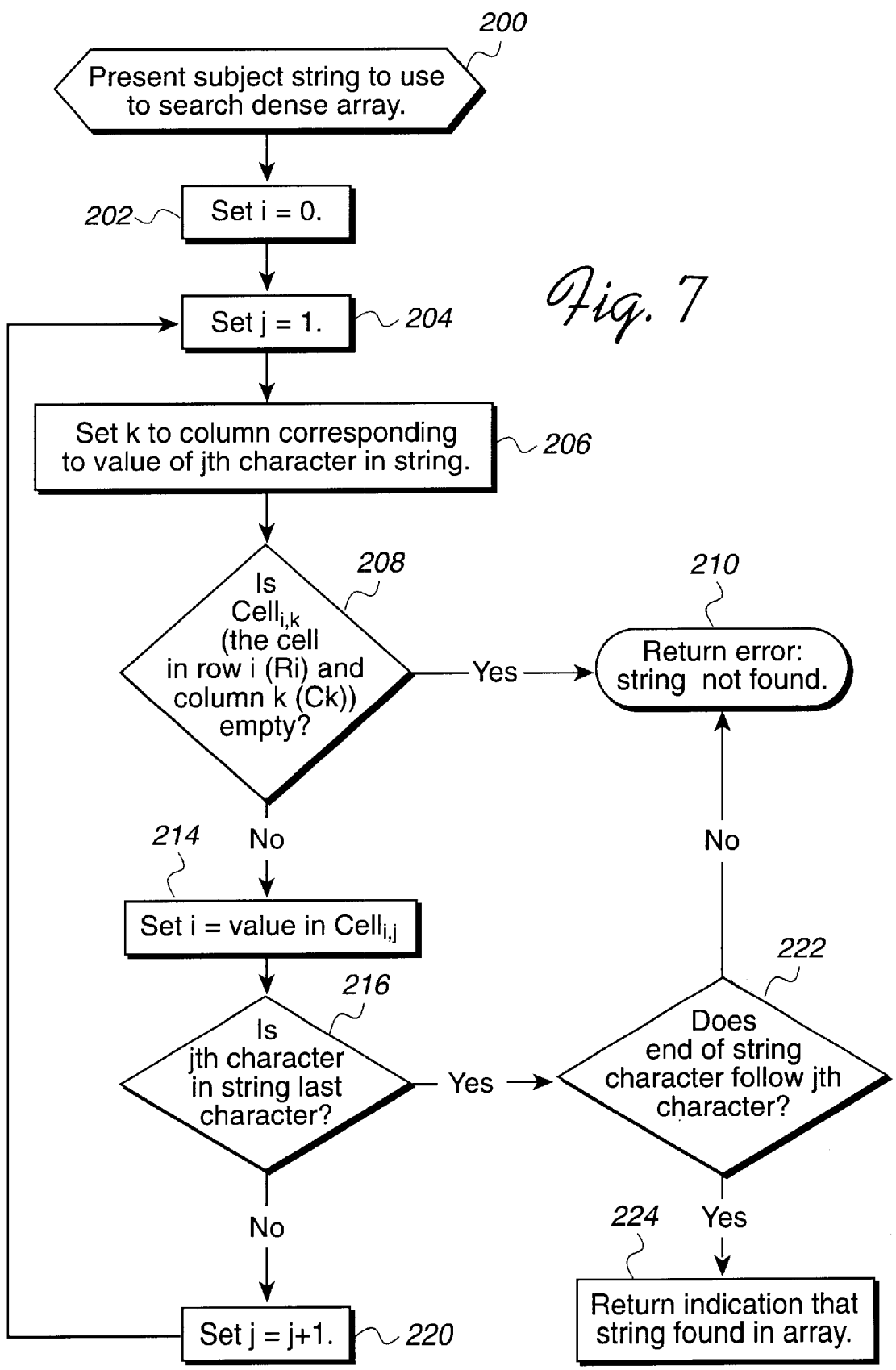
FIG. 7 illustrates logic to search for a string in a dense array in accordance with preferred embodiments of the present invention.

FIG. 7 illustrates logic to search the dense array 14 for a subject string. The logic begins with the processor 4 providing a subject string to use to search the array 14. This string may have been obtained by parsing text in a manner known in the art. The processor 4 sets variable i=0 (at block 202) and variable j=1 (at block 204). The processor 4 sets (at block 206) the variable k to the column corresponding to the value of the jth character in the string, i.e., if the character is "r," then k is set to the column for "r" in the array 14. $Cell_{j,k}$ refers to the cell in row j at column k in the array 14. The processor 4 determines (at block 208) determines whether $Cell_{j,k}$ is empty. In preferred embodiments, this determination is made by scanning the bit map 10 to determine whether the bit map value at row j and column k is OFF, i.e., empty. If so, the processor returns (at block 210) an error message that the string is not found in the array 14 as there is no node for this character at this point in the string. Reaching the error state at block 210 from block 208 indicates that the string has a substring that is not found in the array 14, indicating that the string is not in the array; all characters from the 1st through the (j−1)th character are in the array, however, the array 14 does not include a string having the first through (j−1)th characters followed by the jth character. For instance, if the array included the strings "the" and "their," then at the "a" character in the string "theater", the processor 14 would return an error as there is no substring in the array of "thea". If $Cell_{j,k}$ is not empty, then the processor 4 sets (at block 214) the row value i to the value in $Cell_{j,k}$.

The processor 4 then determines (at block 216) whether the jth character in the search string is the last. If not, the processor 4 sets (at block 220) j to j plus one, i.e., increments to the next character in the string, and returns to block 204 to determine whether the row indicated in $Cell_{j,k}$ includes a non-empty cell in the column corresponding to the next character in the string. Otherwise, if the jth character is the last in the search string, then the processor 4 determines (at block 222) whether the end-of-word indicator is the next node following character j. If so, the processor 4 returns (at block 224) indication that the string was found in the array 14 as all the characters in the string, including the last are in the array 14. Otherwise, if the end-of-string character does not follow the jth character in the dictionary, error is returned (at block 210).

With the logic of FIG. 7, the processor 4 can search an array 14 for a search string to determine if the array 14 includes the search string. For instance, the array may represent a dictionary. In such case, if the search string is present in the array 14, then the spelling is correct; otherwise the string uses incorrect spelling according to the dictionary. In further embodiments, an end of string value may be provided in the array 14 that includes a pointer to a dictionary or thesaurus definition of the word to provide that definition upon locating the match in the array 14.

Preferred embodiments provide a compression algorithm to produce a dense array data structure that optimizes both storage and speed. With larger dictionaries, speed is optimized because processors can locate string characters in an array significantly faster than such strings can be located in a tree. Storage is also optimized as the number of unused cells is minimized, thereby minimizing the space the array uses. For instance, test results have indicated that dense arrays storing a substantial number of words can utilize 50% less storage space than standard binary trie data structures and at the same time process strings 35% faster.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

In further embodiments, the index and bit map may be compressed, which requires an additional level of indexing for the compressed bitmap.

In alternative embodiments, there are further ways to perform the merging of rows and columns in addition to those described herein to further compress the array.

Preferred embodiments were described with respect to the preferred array data structure storing strings of characters or words. However, in further embodiments, the array data structure of the preferred embodiments may be used to store any type of data, not just characters of strings.

Preferred embodiments were described with respect to a two dimensional array or matrix. However, in alternative embodiments arrays of different dimensions may be used.

Preferred embodiments were described with respect to storing strings of characters. However, in alternative embodiments the strings maintained in the preferred dense array data structure could include numeric values or any other character or symbol.

In summary, the present invention provides a system, method, and program for generating a data structure in computer memory for storing strings. Each string includes at least one character from a set of characters. An arrangement of nodes is determined to store the characters such that the arrangement of the nodes is capable of defining a tree structure. An array data structure is generated to store the nodes. The array includes a row for each node and a column for each character in the set of characters. A non-empty cell identifies a node for the character indicated in the column of the cell that has descendant nodes in the row indicated in the cell content for the node. The array data structure is processed to eliminate at least one row in the array data structure to reduce the number of bytes needed to represent the array data structure. In this way, the array data structure following the processing requires fewer bytes of storage space then before the processing.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a data structure in computer memory for storing strings, wherein each string includes at least one character from a set of characters, comprising:

determining an arrangement of nodes to store the characters, wherein the arrangement of nodes is capable of defining a tree structure;

generating an array data structure to store the nodes of the tree including a row for each node and a column for each character in the set of characters, wherein a non-empty cell identifies a node for the character indicated in the column of the cell and having descendant nodes in the row indicated in the cell content; and processing the array data structure to eliminate at least one row in the array data structure to reduce a number of bytes needed to represent the array data structure, wherein the array data structure following the processing requires less bytes of storage space then before the processing.

2. The method of claim 1, wherein the set of characters is a member of the set of character sets comprising: ASCII, Unicode, extended ASCII, ISO Latin 1, alphanumeric characters, and alphanumeric characters and symbols.

3. The method of claim 1, wherein eliminating rows comprises:

determining whether any two rows in the array data structure have a same value in every column; and deleting one of the two rows from the array data structure having the same value in every column.

4. The method of claim 3, further comprising:

generating an index that includes an index entry for each row in the array data structure;

storing a pointer into each index entry pointing to the corresponding row in the array data structure before processing the array data structure; and modifying the pointer in the index entry for the deleted row to point to the row that was not deleted having the same values in every column, wherein the descendant nodes in the deleted row are capable of being determined from the index entry for the deleted row that points to the row into which the contents of the deleted row were copied.

5. The method of claim 3, further comprising performing the steps in claim 3 until there are no two rows in the data structure array having the same value in every column.

6. The method of claim 1, wherein eliminating rows comprises:

determining whether any two rows in the array data structure are capable of being merged;

copying contents from each column of one of the rows into the same column of another row of the two rows capable of being merged; and deleting the row in the array having its contents copied to the other row.

7. The method of claim 6, wherein two rows are not capable of being merged if the content in one column of one of the two rows and the content in the same column of the other of the two rows are both non-empty.

8. The method of claim 6, further comprising:

generating an index that includes an index entry for each row in the array data structure;

generating a pointer into each index entry pointing to the corresponding row in the array data structure before processing the array data structure;

generating a table indicating, for each row corresponding to one index entry, the columns in the row in the array data structure pointed to by the index entry that include descendant nodes; and modifying the pointer in the index entry for the deleted row to point to the row that was not deleted into which the contents of the deleted row was merged, wherein the descendant nodes in the deleted row are capable of being determined from the row in the array pointed to in the index entry and from the columns identified in the deleted row in the table.

9. The method of claim 6, wherein determining whether any two rows are capable of being merged comprises copying the contents of each column in one of the two rows to another column in the row and then determining whether the row having its content shifted is capable of being merged with the other of the two rows, and wherein the merged row including the contents for the two rows includes the column contents of the shifted row in columns offset by a shift value from the columns that included the contents prior to shifting.

10. The method of claim 9, further comprising:

generating an index that includes a first entry for each row in the array data structure and a second entry indicating a number of columns the contents of each column was shifted in the row;

generating a pointer into each index entry pointing to the corresponding row in the array data structure;

generating a node data structure indicating, for each row identified in the index, the columns for the row in the array data structure that identify at least one subsequent node following the node represented by the row in the string;

modifying the pointer in the index entry for the deleted row to point to the row into which the contents of the deleted row was copied, wherein the descendant nodes in the deleted row are capable of being determined from the index entry which indicates the row representing the node; and setting a shift value in the index entry for the row having its contents shifted and merged, wherein the shift value indicates columns offset from the columns indicated in the node data structure that include subsequent node characters following the node represented by the deleted row.

11. The method of claim 1, wherein each string comprises a first and second substrings such that any two strings having the same common second substring have the characters of their second substrings stored at the same nodes in the array data structure.

12. A system for generating a data structure for storing strings, wherein each string includes at least one character from a set of characters, comprising:

a processor;

a memory accessible to the processor;

means for determining an arrangement of nodes to store the characters, wherein the arrangement of nodes is capable of defining a tree structure;

means for generating an array data structure in the memory to store the nodes of the tree including a row for each node and a column for each character in the set of characters, wherein a non-empty cell identifies a node for the character indicated in the column of the cell and having descendant nodes in the row indicated in the cell content; and means for eliminating at least one row in the array data structure to reduce a number of bytes needed to represent the array data structure, wherein the array data structure following the processing requires less bytes of storage space then before the processing.

13. The system of claim 12, wherein the set of characters is a member of the set of character sets comprising: ASCII, Unicode, extended ASCII, ISO Latin 1, alphanumeric characters, and alphanumeric characters and symbols.

14. The system of claim 12, wherein the means for eliminating at least one row comprises:

determining whether any two rows in the array data structure have a same value in every column; and deleting one of the two rows from the array data structure having the same value in every column.

15. The system of claim 14, further comprising:

means for generating an index that includes an index entry for each row in the array data structure;

means for storing a pointer into each index entry pointing to the corresponding row in the array data structure before processing the array data structure; and means for modifying the pointer in the index entry for the deleted row to point to the row that was not deleted having the same values in every column, wherein the descendant nodes in the deleted row are capable of being determined from the index entry for the deleted row that points to the row into which the contents of the deleted row were copied.

16. The system of claim 14, further comprising performing the operations in claim 14 until there are no two rows in the data structure array having the same value in every column.

17. The system of claim 12, wherein the means for eliminating rows comprises:
  determining whether any two rows in the array data structure are capable of being merged;
  copying contents from each column of one of the rows into the same column of other row of the two rows capable of being merged; and
  deleting the row in the array having its contents copied to the other row.

18. The system of claim 17, wherein two rows are not capable of being merged if the content in one column of one of the two rows and the content in the same column of the other of the two rows are both non-empty.

19. The system of claim 17, further comprising:
  means for generating an index that includes an index entry for each row in the array data structure;
  means for generating a pointer into each index entry pointing to the corresponding row in the array data structure before processing the array data structure;
  means for generating a table indicating, for each row corresponding to one index entry, the columns in the row in the array data structure pointed to by the index entry that include descendant nodes; and
  means for modifying the pointer in the index entry for the deleted row to point to the row that was not deleted into which the contents of the deleted row was merged, wherein the descendant nodes in the deleted row are capable of being determined from the row in the array pointed to in the index entry and from the columns identified in the deleted row in the table.

20. The system of claim 17, wherein the means for determining whether any two rows are capable of being merged comprises copying the contents of each column in one of the two rows to another column in the row and then determining whether the row having its content shifted is capable of being merged with the other of the two rows, and wherein the merged row including the contents for the two rows includes the column contents of the shifted row in columns offset by a shift value from the columns that included the contents prior to shifting.

21. The system of claim 20, further comprising:
  means for generating an index that includes a first entry for each row in the array data structure and a second entry indicating a number of columns the contents of each column was shifted in the row;
  means for generating a pointer into each index entry pointing to the corresponding row in the array data structure;
  means for generating a node data structure indicating, for each row identified in the index, the columns for the row in the array data structure that identify at least one subsequent node following the node represented by the row in the string;
  means for modifying the pointer in the index entry for the deleted row to point to the row into which the contents of the deleted row was copied, wherein the descendant nodes in the deleted row are capable of being determined from the index entry which indicates the row representing the node; and
  means for setting a shift value in the index entry for the row having its contents shifted and merged, wherein the shift value indicates columns offset from the columns indicated in the node data structure that include subsequent node characters following the node represented by the deleted row.

22. The system of claim 12, wherein each string comprises a first and second substrings such that any two strings having the same common second substring have the characters of their second substrings stored at the same nodes in the array data structure.

23. An article of manufacture for use in programming a computer to generate a data structure in computer memory for storing strings, the article of manufacture comprising a computer usable medium including at least one computer program that causes the computer to perform:
  determining an arrangement of nodes to store the characters, wherein the arrangement of nodes is capable of defining a tree structure;
  generating an array data structure to store the nodes of the tree including a row for each node and a column for each character in the set of characters, wherein a non-empty cell identifies a node for the character indicated in the column of the cell and having descendant nodes in the row indicated in the cell content; and
  processing the array data structure to eliminate at least one row in the array data structure to reduce a number of bytes needed to represent the array data structure, wherein the array data structure following the processing requires less bytes of storage space then before the processing.

24. The article of manufacture of claim 23, wherein the set of characters is a member of the set of character sets comprising: ASCII, Unicode, extended ASCII, ISO Latin 1, alphanumeric characters, and alphanumeric characters and symbols.

25. The article of manufacture of claim 23, wherein eliminating rows comprises:
  determining whether any two rows in the array data structure have a same value in every column; and
  deleting one of the two rows from the array data structure having the same value in every column.

26. The article of manufacture of claim 25, further comprising:
  generating an index that includes an index entry for each row in the array data structure;
  storing a pointer into each index entry pointing to the corresponding row in the array data structure before processing the array data structure; and
  modifying the pointer in the index entry for the deleted row to point to the row that was not deleted having the same values in every column, wherein the descendant nodes in the deleted row are capable of being determined from the index entry for the deleted row that points to the row into which the contents of the deleted row were copied.

27. The article of manufacture of claim 25, further comprising performing the steps in claim 25 until there are no two rows in the data structure array having the same value in every column.

28. The article of manufacture of claim 23, wherein eliminating rows comprises:
  determining whether any two rows in the array data structure are capable of being merged;
  copying contents from each column of one of the rows into the same column of another row of the two rows capable of being merged; and
  deleting the row in the array having its contents copied to the other row.

29. The article of manufacture of claim 28, wherein two rows are not capable of being merged if the content in one column of one of the two rows and the content in the same column of the other of the two rows are both non-empty.

30. The article of manufacture of claim 28, further comprising:

generating an index that includes an index entry for each row in the array data structure;

generating a pointer into each index entry pointing to the corresponding row in the array data structure before processing the array data structure;

generating a table indicating, for each row corresponding to one index entry, the columns in the row in the array data structure pointed to by the index entry that include descendant nodes; and modifying the pointer in the index entry for the deleted row to point to the row that was not deleted into which the contents of the deleted row was merged, wherein the descendant nodes in the deleted row are capable of being determined from the row in the array pointed to in the index entry and from the columns identified in the deleted row in the table.

31. The article of manufacture of claim 28, wherein determining whether any two rows are capable of being merged comprises copying the contents of each column in one of the two rows to another column in the row and then determining whether the row having its content shifted is capable of being merged with the other of the two rows, and wherein the merged row including the contents for the two rows includes the column contents of the shifted row in columns offset by a shift value from the columns that included the contents prior to shifting.

32. The article of manufacture of claim 31, further comprising:

generating an index that includes a first entry for each row in the array data structure and a second entry indicating a number of columns the contents of each column was shifted in the row;

generating a pointer into each index entry pointing to the corresponding row in the array data structure;

generating a node data structure indicating, for each row identified in the index, the columns for the row in the array data structure that identify at least one subsequent node following the node represented by the row in the string;

modifying the pointer in the index entry for the deleted row to point to the row into which the contents of the deleted row was copied, wherein the descendant nodes in the deleted row are capable of being determined from the index entry which indicates the row representing the node; and setting a shift value in the index entry for the row having its contents shifted and merged, wherein the shift value indicates columns offset from the columns indicated in the node data structure that include subsequent node characters following the node represented by the deleted row.

33. The article of manufacture of claim 23, wherein each string comprises a first and second substrings such that any two strings having the same common second substring have the characters of their second substrings stored at the same nodes in the array data structure.

34. A memory device including data structures for storing strings, wherein each string includes at least one character from a set of characters, wherein the data structures in the memory comprise:

a first array data structure storing nodes that define an arrangement of characters in the strings, wherein the arrangement of nodes is capable of defining a tree data structure, wherein the first array data structure comprises rows and columns of cells, wherein a non-empty cell identifies a node for the character indicated in the column of the cell and having descendant nodes in the row indicated in the cell content; and a second array data structure generated by processing the first array data structure to eliminate at least one row in the first array data structure to reduce a number of bytes needed to represent the nodes of the tree in the first array data structure, wherein the second array data structure uses less bytes of storage space than the first array data structure, and wherein the number of rows in the second array data structure is less than the number of nodes such that one row in the second array data structure is capable of representing at least two nodes.

35. The memory device of claim 34, wherein every row in the second array data structure includes at least one non-empty column including a character.

36. The memory device of claim 34, wherein no two rows in the second array data structure include a same value in every column.

37. The memory device of claim 34 further comprising an index including an index entry for each node in the second array data structure, wherein each index entry points to one of the rows in the second array data structure including the descendant nodes for the index entry, and wherein at least two index entries point to the same row identifying that same row as including the descendants for the index entry row.

38. The memory device of claim 34, wherein the cells from at least one column of any two rows in the second array data structure are both non-empty.

39. The memory device of claim 34, wherein each string comprises a first and second substrings such that any two strings having the same common second substring have the characters of their second substrings stored at the same nodes in the second array data structure.

* * * * *

UNITED STATES PATENT AND TRADEMARK OFFICE
CERTIFICATE OF CORRECTION

PATENT NO. : 6,470,347 B1
DATED : October 22, 2002
INVENTOR(S) : Richard Theodore Gillam It is certified that error appears in the above-identified patent and that said Letters Patent is hereby corrected as shown below:

<u>Column 13,</u>
Line 6, replace "other" with -- another --.

Signed and Sealed this

Twenty-seventh Day of September, 2005

JON W. DUDAS
*Director of the United States Patent and Trademark Office*